Jan. 29, 1957 N. E. KLEIN 2,779,486
VEHICLE MOUNTED TREE AND STUMP MOVING EQUIPMENT
Filed Sept. 10, 1953
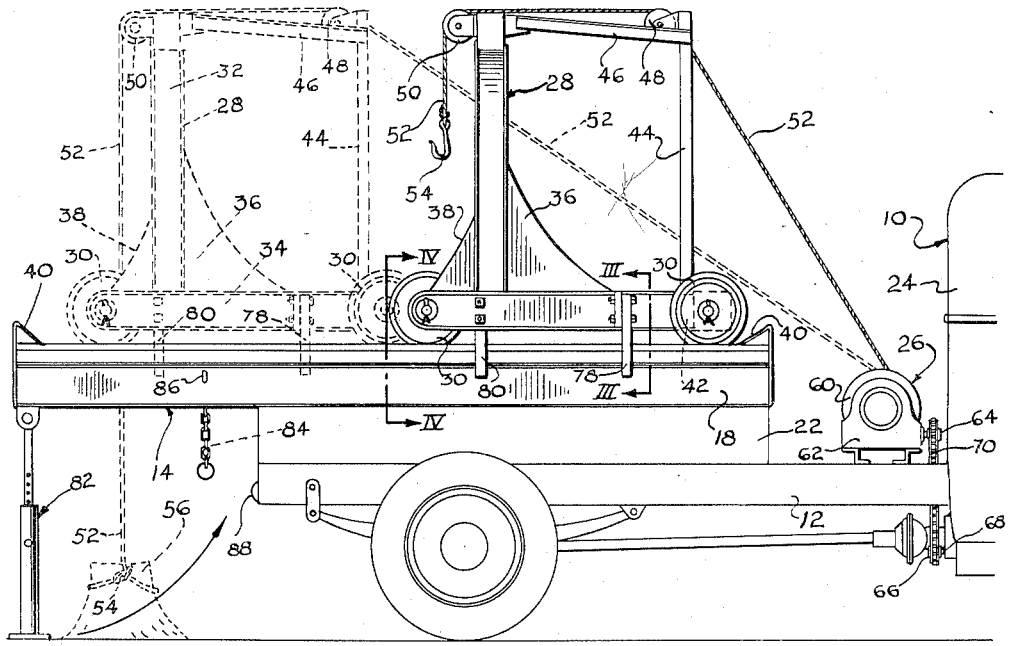
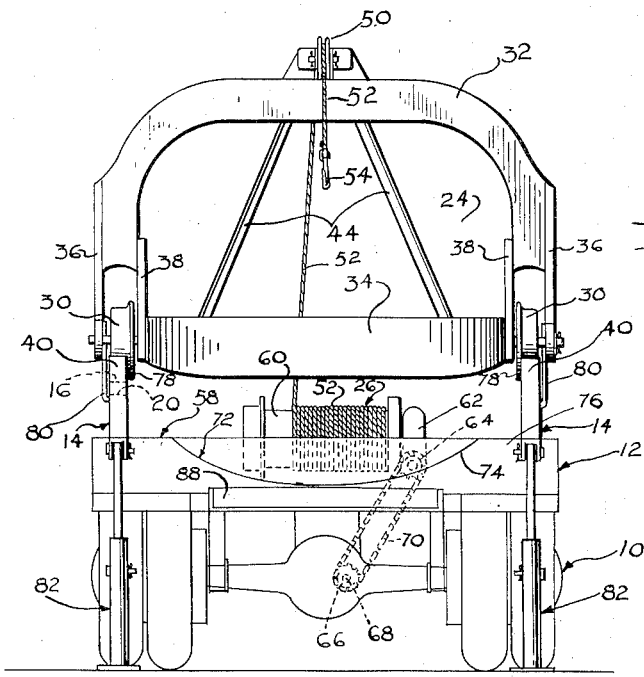
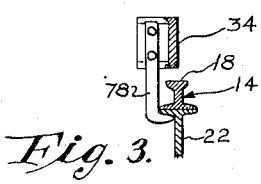
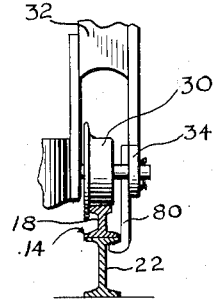
INVENTOR.
Norman Klein
BY
ATTORNEY.

United States Patent Office 2,779,486
Patented Jan. 29, 1957

2,779,486

VEHICLE MOUNTED TREE AND STUMP MOVING EQUIPMENT

Norman E. Klein, Kansas City, Mo.

Application September 10, 1953, Serial No. 379,409

2 Claims. (Cl. 214—75)

This invention relates to apparatus for raising and moving heavy bodies, the primary object being to provide in a mobile vehicle, structure including purchase means for pulling and raising trees, stumps and the like and transferring the same to the bed of the vehicle for disposition thereof as may be desired or become necessary.

It is the most important object of the present invention to provide equipment for pulling and moving trees, stumps and the like that includes a carriage reciprocable on a track that is in turn carried by the frame of a truck or other mobile vehicle in overlying relationship to the bed of the truck, all to the end that when purchase means forming a part of the equipment is placed in use, the tree or stump may be pulled, elevated and transferred to the truck bed easily and expeditiously.

Other objects of this invention include the way in which the track aforementioned has a pair of horizontal rails projecting rearwardly beyond the truck bed; the manner of forming the carriage from a pair of U-shaped members to provide clearance for the tree or stump as it is raised and transferred to the truck bed; the manner of providing a cable and pulley assembly on the carriage, together with the use of a windlass on the frame of the truck for exerting force by traction on the cable; and many additional objects including important details of construction all of which will be made clear as the following specification progresses.

In the drawing:

Figure 1 is a fragmentary, side elevational view of tree moving equipment made pursuant to the present invention illustrating its manner of use by dotted lines.

Fig. 2 is a rear elevational view thereof.

Fig. 3 is a fragmentary, detailed, cross-sectional view taken on line III—III of Fig. 1; and Fig. 4 is a fragmentary, detailed, cross-sectional view taken on line IV—IV of Fig. 1.

It is recognized that hoist structure including cranes and the like has heretofore been provided on trucks to pull stumps, trees and lift heavy bodies generally, and to transfer the same to the bed of the truck. Such equipment however, is generally large, bulky and expensive to manufacture. Furthermore, it requires a rather large working space in order to effectively raise the object or pull the same from the earth and subsequently transfer it to the truck bed.

The present invention has been designed to improve upon such prior art and to this end there is illustrated in Figs. 1 and 2 of the drawing, a mobile vehicle which may be in the nature of a truck 10 having a chassis that includes a frame 12 upon which is mounted in any suitable manner, an elongated, horizontal track 14 that includes a pair of spaced, parallel rails 16 and 18.

Rails 16 and 18 are in turn supported on the frame 12 through the medium of beams 20 and 22 respectively, it being noted in Fig. 1 of the drawing that the rails 16 and 18 project rearwardly beyond the normally rearmost end of the frame 12 and the overlying beams 20 and 22. It is to be preferred further that the beams 20 and 22, as well as the track 14, be spaced rearwardly of cab 24 of the truck 10 to provide clearance for power means broadly designated by the numeral 26.

The track 14 supports a shiftable carriage broadly designated by the numeral 28, carriage 28 being rendered mobile and therefore, reciprocable longitudinally of the rails 16 and 18 through the medium of a plurality of flanged wheels 30 having the form shown most clearly in Fig. 4 of the drawing. The primary elements of the carriage 28 consist of a vertical, U-shaped framepiece 32, and a horizontal, U-shaped framepiece 34. The lowermost ends of the legs of the framepiece 32 are joined to the legs of the framepiece 34 and the legs of the latter extend rearwardly beyond the framepiece 28 as shown in Fig. 1 to receive the two rearmost wheels 30. Suitable gusset work 36 and 38 between the legs of the framepieces 32 and 34 are provided for purposes of rigidity.

Each rail 16 and 18 is provided with upstanding abutments 40 at the ends thereof for limiting the extent of reciprocable movement of carriage 28. A transverse bar 42 on the framepiece 34 at the bight thereof, receives the forwardmost wheels 30 of the carriage 28.

A pair of legs 44 extending upwardly from the cross bar 42 and converging as the uppermost ends thereof are approached, receive a pair of substantially horizontal connecting bars that converge as the bight of framepiece 32 is approached, one only of which is shown in Fig. 1 of the drawing and designated by the numeral 46. The bars 46 accordingly join the legs 44 with the framepiece 32. Legs 44 and framepiece 32 mount pulleys 48 and 50 respectively at the uppermost ends thereof for receiving a chain, rope or cable 52 trained thereover and which may be provided with a hook 54 at one end thereof to facilitate attachment of the cable 52 to a heavy body to be lifted, to a tree or to a stump 56 to be pulled from the earth, elevated and transferred to bed 58 of the truck 10.

The power means 26 for exerting force by traction on the cable 52, is in the nature of a windlass including a rotatable drum 60 about which the cable 52 is coiled. A gear box 62 has the gears thereof operably coupled with the drum 60 and with a sprocket wheel 64 that is in turn connected with a second sprocket wheel 66 on power take-off shaft 68 by a continuous chain or the like 70. It is seen therefore, that the prime mover for the truck 10 may be utilized to drive the power means 26 and that suitable controls therefor (not shown) may be provided within the cab 24.

Bed 58 of the truck 10 which is coextensive in length with the beams 20 and 22 and mounted therebetween, has a longitudinally, extending concave portion 72 that is mounted within similarly shaped cavities 74 in cross members 76 that join the beams 20 and 22, one only of such cross members 76 being shown in Fig. 2 of the drawing.

Each of the legs of the horizontal, U-shaped framepiece 34 is provided with a pair of relatively offset, spaced hooks 78 and 80 respectively, engaging within the eye beams 20 and 22 as shown in Figs. 3 and 4 of the drawing to hold the wheels 30 on the uppermost surfaces of rails 16 and 18.

It is to be preferred that the track 14 be supported in some suitable manner at the rearmost end thereof when the equipment is placed in use to pull a stump 56 or lift other heavy bodies and to this end there is provided an extensible jack 82, depending from each rail 16 and 18 respectively and swingably secured thereto for movement to and from a horizontal position supported by the said rails in a suitable manner such as by use of a short chain 84 adapted to engage a hook 86. It is understood of course, that such holding means 84—86 is provided for each jack 82 respectively. Cable 52 is protected against damage during use through the medium of an elongated pipe or the like 88 on the rearmost cross member 76.

In use, when the jacks 82 are positioned as shown in Figs. 1 and 2 supporting the rearmost end of the track 14, carriage 28 is moved along the rails 16 and 18 to the position illustrated by dotted lines in Fig. 1. The cable 52 is wrapped around the stump 56 and attached thereto through the medium of hook 54. Thereupon, the power means 26 is placed in operation to exert a drawing force on the cable 52 and by virtue of the pulleys 48 and 50, the stump 56 is pulled from the earth and elevated upwardly between the rails 16 and 18, between the rear wheels 30 and within the confines of the two U-shaped framepieces 32 and 34. Thereupon the carriage 28 may be moved to the full-line position of Fig. 1 carrying the stump 56 therewith for positioning on the truck bed 58. During the upward pull on the stump 56, the hooks 78 and 80 will prevent tipping or lateral displacement of the carriage 28 with respect to the track 14 and will also bind the carriage 28 to the track 14 against movement from the position shown by dotted lines in Fig. 1 to the position shown by full lines of Fig. 1.

Having thus described the invention what is claimed as new and desired to be secured by Letters Patent is:

1. In apparatus for pulling and loading the stumps, the combination of a vehicle having a frame, an elongated, transversely concave bed provided with a pair of spaced, longitudinal beams, and a horizontal track including a longitudinal rail mounted on each beam respectively and extending rearwardly of the vehicle beyond said bed, said beams and said frame; a carriage shiftable along said track and including a vertical and a horizontal U-shaped framepiece, each provided with a pair of legs, the horizontal framepiece extending forwardly from and having its legs joined to the lowermost ends of the legs of the vertical framepiece; flanged wheels attached to the horizontal framepiece and resting on said rails; upstanding frame means secured to the bight of the horizontal framepiece and provided with means at the upper end thereof connecting the same with the bight of the vertical framepiece; a pulley secured to said upper end of the frame means and to said bight of the vertical framepiece respectively; a windlass mounted on the frame forwardly of the bed, the beams and the track and including a rotatable drum; and a cable coiled about and having one end thereof secured to the drum, said cable extending upwardly from the drum, over said pulleys and thence downwardly between the legs of the horizontal framepiece and between the rails to a point of attachment to a tree stump when the carriage is at the rearmost end of the track.

2. In apparatus for pulling and loading the stumps, the combination of a vehicle having a frame, an elongated, transversely concave bed provided with a pair of spaced, longitudinal beams, and a horizontal track including a longitudinal rail mounted on each beam respectively and extending rearwardly of the vehicle beyond said bed, said beams and said frame; a carriage shiftable along said track and including a vertical and a horizontal, U-shaped framepiece, each provided with a pair of legs, the horizontal framepiece extending forwardly from and having its legs joined to the lowermost ends of the legs of the vertical framepiece; flanged wheels attached to the horizontal framepiece and resting on said rails; upstanding frame means secured to the bight of the horizontal framepiece and provided with means at the upper end thereof connecting the same with the bight of the vertical framepiece; a pulley secured to said upper end of the frame means and to said bight of the vertical framepiece respectively; a windlass mounted on the frame forwardly of the bed, the beams and the track and including a rotatable drum; a cable coiled about and having one end thereof secured to the drum, said cable extending upwardly from the drum, over said pulleys and thence downwardly between the legs of the horizontal framepiece and between the rails to a point of attachment to a tree stump when the carriage is at the rearmost end of the track; and a plurality of hooks mounted on the horizontal framepiece and looped beneath a portion of each beam respectively for holding the carriage against tipping, lateral displacement and shifting along the track as the tree stump is pulled and lifted to a position for loading on the bed.

References Cited in the file of this patent

UNITED STATES PATENTS

| | | |
|---|---|---|
| 898,501 | Pederson | Sept. 15, 1908 |
| 1,702,546 | Owens et al. | Feb. 19, 1929 |
| 2,025,340 | Crocker | Dec. 24, 1935 |
| 2,156,424 | Barnard | May 2, 1939 |
| 2,504,232 | Smith | Apr. 18, 1950 |
| 2,597,740 | Lyle, III | May 20, 1952 |
| 2,605,914 | Hala | Aug. 5, 1952 |
| 2,701,655 | Crile | Feb. 8, 1955 |

FOREIGN PATENTS

| | | |
|---|---|---|
| 22,561/29 | Australia | Aug. 8, 1930 |